Dec. 12, 1944.   F. R. HENSEL   2,364,713
BEARING
Filed June 22, 1943
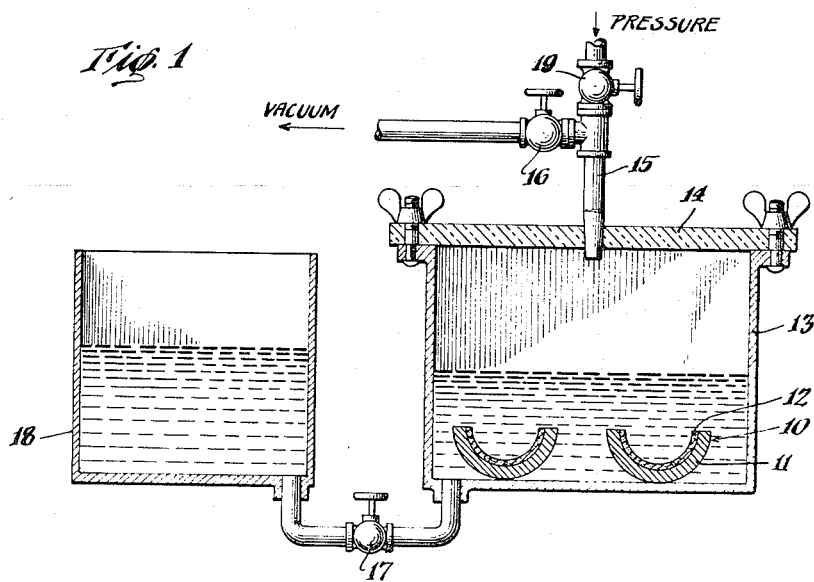
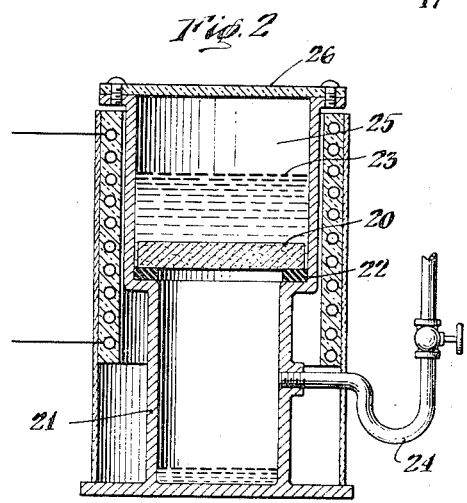
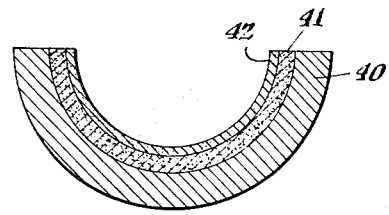
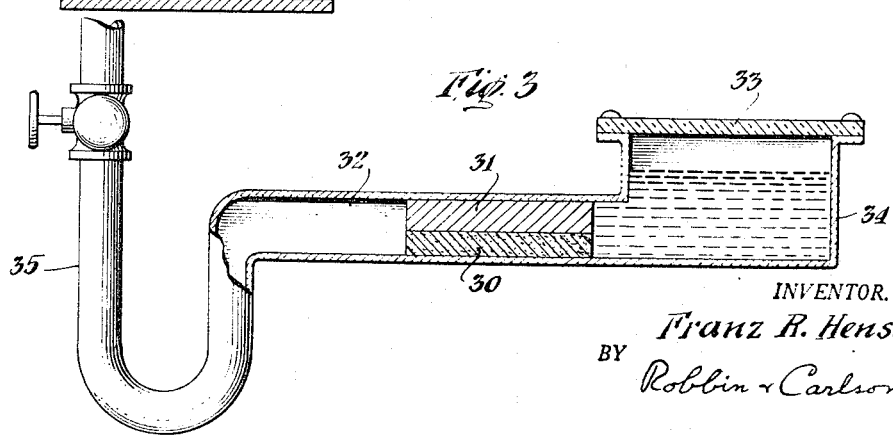
INVENTOR.
Franz R. Hensel
BY Robbin & Carlson
ATTORNEYS Patented Dec. 12, 1944

2,364,713

UNITED STATES PATENT OFFICE 2,364,713

BEARING

Franz R. Hensel, Indianapolis, Ind., assignor to P. R. Mallory & Co., Inc., Indianapolis, Ind., a corporation of Delaware Application June 22, 1943, Serial No. 491,749

12 Claims. (Cl. 308—237)

This invention relates to bearings and bearing compositions.

An object of the invention is to improve bearings and bearing compositions.

Other objects of the invention will be apparent from the description and claims.

In the drawing:

Figure 1 is a diagram illustrating a method of making a bearing embodying features of the present invention;

Figures 2 and 3 show modifications of the method of impregnating with mercury; and Figure 4 is a cross section of a bearing embodying features of the invention.

The present invention contemplates a bearing formed of mercury together with a material which does not amalgamate to any appreciable extent with mercury. The invention also contemplates the use of additional ingredients which do or do not amalgamate with the mercury and also contemplates the use of wetting agents to bring about a wetting of the non-amalgamable material by the mercury.

The preferred non-amalgamating material is a metal selected from the iron group such as iron, nickel or cobalt.

One method of forming a bearing comprises pressing iron powder, or powder of one of the other metals referred to, into a porous compact of the desired size and shape and then impregnating the compact with mercury.

Figure 1 illustrates one method of impregnating the bearing. Bearing blanks 10 each comprising a solid steel backing shell 11 lined with a porous iron powder lining 12 pressed and sintered onto the backing are placed in a chamber 13 which is then sealed with a cover 14. A vacuum is then produced in the chamber by means of pipe 15 which is connected to a vacuum pump. This withdraws substantially all of the air from the pores of the lining 12. Valve 16 leading to the vacuum pump is then closed and valve 17 leading from a mecury tank 18 to the bottom of chamber 13 is then opened to permit mercury to flow into the chamber and cover the bearings 10. If necessary valve 17 may then be closed and a valve 19 leading to a source of compressed air may be opened to apply pressure to the mercury bath and promote impregnation. The bath may also be heated if desired.

After impregnation is complete the mercury is drawn off and the impregnated bearings are removed.

Other means for vacuum impregnation of bearing blanks are shown in Figures 2 and 3. In Figure 2 the bearing blank is a solid porous body 20 which is placed on a rubber ring 22 on shoulder formed in the wall of a vacuum container 21. A certain amount of mercury 23 is placed on top of the porous bearing blank and vacuum is applied to the bottom side through vacuum line 24. The vacuum will first free the pores from air and then draw mercury into the voids. The pressure is regulated in such a manner that most of the mercury is retained in the pores.

Thus by regulating the initial height of the mercury above the blank in proportion to the air space 25 and then sealing the top with a cover 26 the remaining air will supply a predetermined pressure.

Figure 3 illustrates a method of impregnating a porous lining 30 having a steel backing 31 bonded thereto. The bearing blank is placed in a tube 32 having a cross section which closely fits the blank. If necessary a sealing material is used to perfect the seal around the blank. The tube has one end formed into a mercury reservoir 34 which is partly filled with mercury, and then sealed with a cover 33. Vacuum is applied through a U-tube 35 at the other end to draw the mercury into the voids in the porous blank.

In order to improve impregnation it is sometimes desirable to add a wetting agent to the mercury. For impregnating an iron bearing it is possible to add a trace of magnesium or titanium or both to the mercury. This promotes the wetting of iron by the mercury. Other wetting agents can also be used.

In some cases additional ingredients may be added to the powder compact which is to be impregnated with the mercury. Among such ingredients are graphite and molybdenum sulfide. Metals which amalgamate with mercury may also be added either to the powder compact or dissolved in the mercury prior to impregnation. Among such metals are lead, silver, copper, gold, cadmium, tin and indium. The proportion of such ingredients to the mercury should be small enough to produce a liquid amalgam under the operating temperature at which the bearing will receive its heaviest service. Bearing temperatures may run to 200° F. or higher under operating conditions.

As the bearing lining is under compression during operation the combination of the pressure and high temperature will bring an increased supply of mercury to the bearing surface thus increasing the rate of lubrication and cooling.

In some cases it is contemplated that the porous portion of the bearing may be formed into two or more layers of different composition. Figure 4 illustrates one structure of this type wherein the steel backing 40 is lined with a porous sintered iron powder lining 41 having an inner surface portion 42 formed of a mixture of iron and silver powder. Upon impregnation with mercury, a surface zone is formed having a mercury-silver amalgam backed up by a porous iron layer impregnated with mercury.

While a variety of powder grain sizes may be used or a mixture of powders of different fineness, it is generally preferred that the grain size of the powder used shall be between 50 and 325 mesh. Coarser particles produce a rough bearing and do not distribute the mercury evenly enough over the surface. Powders finer than 325 mesh produce such fine pores when pressed and sintered that it is difficult to impregnate them with mercury.

In some instances the bearing compact may be only partially impregnated with mercury to leave a certain percentage of voids which can be filled with oil.

The bearing of the present invention may be operated against a steel shaft or against shafts of other materials which do not amalgamate with mercury. In cases where wetting agents are added to the mercury, the mercury will wet the shaft. This will retain a constant film of mercury between the bearing surfaces. The present bearing is different from any of the existing constructions or compositions because it provides the presence of a liquid metal under all operating conditions. The bearing materials of the prior art such as copper lead provide a liquid metal only when the bearing is severely overheated and the lubricating oil film has failed. By having a liquid metal present under normal operating conditions the dangers of overheating, seizure, unequal thermal expansion, decrease of fatigue and creep strength due to elevated temperatures are materially reduced if not eliminated.

The bearings may be used for a multitude of applications. They are ideal to replace small oilless bearings. In such cases porous metal bodies filled with mercury are used without steel or other metal backings. For high duty applications steel backings are essential to carry the load and only a comparatively thin lining of a mercury filled porous structure is used as actual bearing surface.

While specific embodiments of the invention have been described, it is intended to cover the invention broadly within the spirit and scope of the appended claims.

What is claimed is:
1. A bearing formed of a porous body of a non-amalgamating material, and mercury in the pores of said body.
2. A bearing formed of a porous body of a non-amalgamating material and a mercury amalgam in the pores of said body.
3. A bearing formed of a porous body of a non-amalgamating material, and mercury in the pores of said body, said mercury containing a wetting agent.
4. A bearing formed of a metal composition of metal selected from the group consisting of iron, nickel and cobalt together with mercury.
5. A bearing formed of a metal composition of metal selected from the group consisting of iron, nickel and cobalt together with mercury, and a soft amalgamating metal.
6. A bearing formed of a metal composition of metal selected from the group consisting of iron, nickel and cobalt together with mercury, and a soft amalgamating metal selected from the group consisting of gold, silver, lead, copper, cadmium, tin and indium.
7. A bearing comprising a layer of compacted and bonded powder of non-amalgamating metal, and mercury in the pores of said layer.
8. A bearing having at least the surface layer thereof formed of compacted and bonded metal powders predominantly selected from the group consisting of iron, cobalt and nickel, and mercury in the pores of said layer.
9. A bearing comprising a solid steel backing and a lining of sintered iron powder bonded thereto, and mercury impregnating said lining.
10. A bearing comprising a solid steel backing and a lining of sintered iron powder bonded thereto, and mercury impregnating said lining, said mercury containing a wetting agent selected from the group consisting of magnesium and titanium.
11. A bearing comprising a solid metal backing and a lining of sintered metal powder bonded thereto, said powder being formed of a non-amalgamating metal, and a mercury amalgam in the pores of said lining, said amalgam having a melting point below 200° F.
12. A bearing formed of a steel backing, an intermediate lining of pressed and sintered iron powder bonded thereto, and an inner lining of mixed pressed and sintered iron and silver powders bonded to said intermediate lining, said linings being impregnated with mercury, said silver being amalgamated thereby.

FRANZ R. HENSEL.